April 12, 1949.   C. W. COCHRAN   2,467,294
VISOR MOUNTING MEANS
Filed Aug. 1, 1945
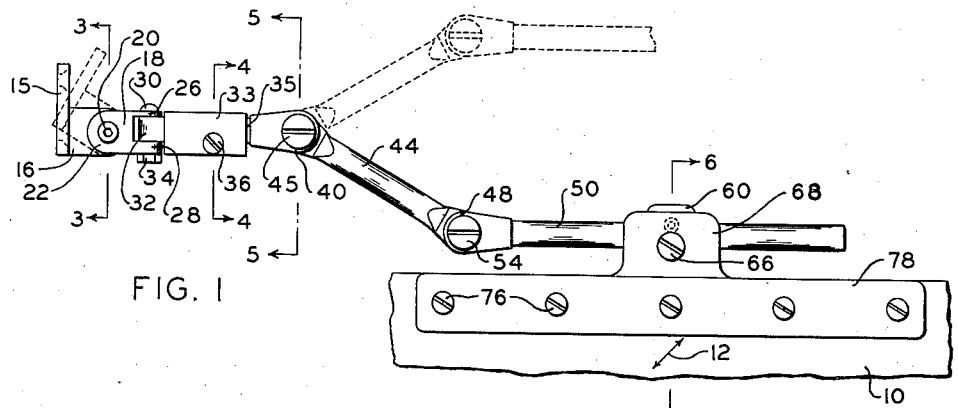
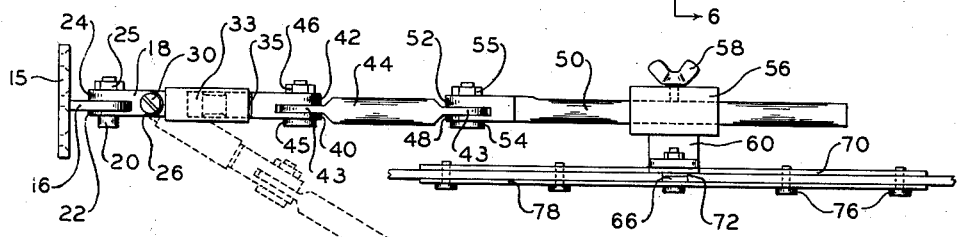
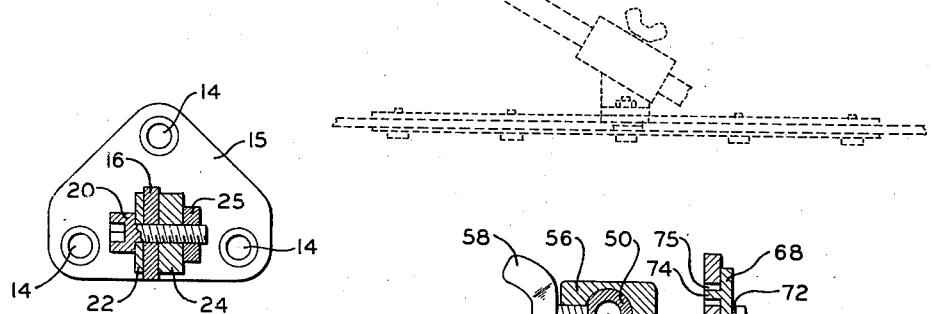
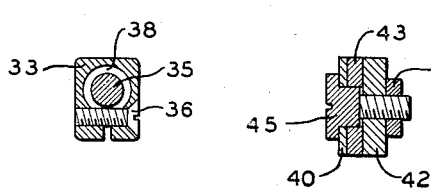
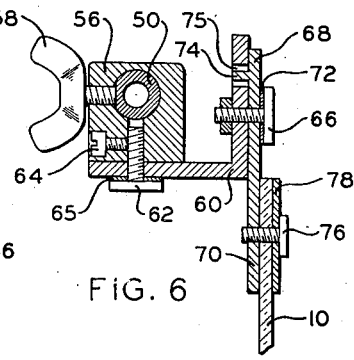
INVENTOR.
Clarence W. Cochran
BY Donald L. Brown
Attorney Patented Apr. 12, 1949

2,467,294

UNITED STATES PATENT OFFICE 2,467,294

VISOR MOUNTING MEANS

Clarence W. Cochran, Belmont, Mass., assignor to Polaroid Corporation, Cambridge, Mass., a corporation of Delaware Application August 1, 1945, Serial No. 608,247

4 Claims. (Cl. 248—278)

This invention relates to a new and improved viewing visor and visor mounting device for use in vehicles, and particularly adapted for use in a system of polarized headlighting for automobiles or other vehicles.

It is a particular object of the invention to provide mounting means for a viewing visor which will make possible substantially universal adjustment of said visor and which will also comprise friction means adapted to hold said visor in any desired position.

Another object is to provide such visor mounting means providing for frictionally controlled adjustment of said visor about a vertical axis and providing separately for frictionally controlled adjustment of said visor about a horizontal axis.

A further object is to provide means of the above type comprising also means providing for adjustment of the visor mounted thereby in a plane parallel to said horizontal pivot means and particularly in a substantially vertical plane.

A still further object is to provide novel means for securing a visor to the visor mounting means of the invention, and particularly to provide such means which will also provide for a predetermined degree of tilting of said visor about an axis substantially parallel to the line of sight therethrough.

A still further object is to provide novel mechanical linkages and frictionally controlled pivotal joints useful in practicing the invention.

Additional objects and advantages will in part appear and in part be pointed out in the course of the following detailed description of one embodiment of the invention, which is given as a nonlimiting example in connection with the accompanying drawings, in which:

Figure 1 is a view in elevation showing the device as seen by the driver of a vehicle wherein it is mounted;

Figure 2 is a plan view of the device shown in Fig. 1;

Figure 3 is a section substantially on the line 3—3 in Fig. 1;

Figure 4 is a section substantially on the line 4—4 in Fig. 1;

Figure 5 is a section substantially on the line 5—5 in Fig. 1; and

Figure 6 is a section substantially on the line 6—6 in Fig. 1.

In the drawings, visor 10 may comprise any suitable selectively light-absorbing material, but the invention is particularly concerned with the provision of mounting means for a polarizing visor adapted for use as an analyzer in a system of polarized vehicle headlighting such for example as those systems shown in United States Patents Nos. 2,031,045 and 2,087,795. In such case visor 10 will comprise light-polarizing material, such for example as any of the sheet light-polarizing materials sold under the trade name "Polaroid," and will have its polarizing axis arranged substantially at an angle of 45° to the vertical, as indicated by arrow 12. It should be expressly understood, however, that the invention is not limited to polarizing visors and is equally applicable to any of the materials conventionally used for anti-glare purposes in an automobile or other vehicle.

Mounting or base plate 15 is provided with a plurality of holes 14 adapted to receive any screws or bolts suitable for securing said plate within a vehicle. Tongue member 16, which projects from base plate 15 and is preferably substantially perpendicular thereto, engages in one of the forked ends of link element 18 and is designed to be locked therein as by means of locking screw 20. The construction of this joint is shown in section in Fig. 3, and it will be noted that said fork comprises a relatively thin member 22 and a substantially thicker member 24 to facilitate a positive lock on tongue 16. Screw 20 is provided with a lock nut 25 and may be of any type, a preferred example being shown as the type known as an "Allen" screw and provided with a hexagonal hole in the head thereof instead of a more conventional slot.

The opposite end of link element 18 similarly comprises thin and thick fork members 26 and 28 arranged at right angles to fork members 22 and 24 and carrying a bolt 30 which is at right angles to screw 20 and serves as a pivot for tongue 32 projecting from block 33. Bolt 30 is designed to serve as the pivot for horizontal adjustment of the visor of the invention. Accordingly, when the device of the invention is installed in a vehicle, plate 15 is preferably so positioned that screw 20 is substantially horizontal. Element 18 is then rotated thereon until its is horizontal and thereby places bolt 30 in the desired vertical position. Screw 20 is then tightened to lock element 18 against further movement, but bolt 30 is tightened only sufficiently to exert a frictional hold on tongue 32 against free rotation and is then held by lock nut 34. It should be understood, however, that although this is a preferred construction, the invention is not limited thereto and other, equivalent frictional pivot means may be substituted therefor without departing from within the scope of the invention.

As is shown particularly in Fig. 2, block 33 serves as a bearing for shaft 35, which has one end journaled therein. Block 33 is bifurcated longitudinally and provided with a lock screw 36 for the purpose of exerting adjustable friction on shaft 35. Rod 35 is also provided with an annular groove 38 adapted for engagement with the shank of screw 36 to retain shaft 35 within block 33. At its opposite end, rod 35 is flattened and forms a fork similar to those of element 18 and comprising a relatively thin member 40 and a substantially thicker member 42 adapted to receive one of the flattened tongue portions 43 at each end of rod-shaped link element 44. As is shown particularly in Fig. 5, bolt 45 comprises a smooth shank portion journaled in fork member 40 and tongue 43 and a portion of reduced diameter threaded into fork member 42 and provided with a lock nut 46. In adjusting this joint, bolt 45 is tightened until fork members 40 and 42 exert sufficient frictional pressure on the end of link 44 to hold it in any position while still permitting manual rotation thereof about bolt 45, and lock nut 46 is then tightened in place. This construction has marked advantages in the practice of the invention. It makes possible an extremely tight connection if no motion about bolt 45 is desired, but if frictional motion is wanted, a looser connection may be made and there may then be relative motion between tongue 43 and fork members 40 and 42 about the smooth shank of bolt 45 with no danger of further loosening the connection. A similar construction is desirable at the connection between elements 18 and 33, for the same reasons, and is also provided at the other end of link 44, which is similarly flattened at 43 and engages in the forked end 48, 52 of rod 50, said fork being substantially identical in construction with the forked end of shaft 35 and being provided with a bolt 54 and nut 55 substantially identical with bolt 45 and nut 46. It will be noted that in the above combination of elements, bolt 30 and shaft 35 provide one pair of pivots, each of which is always perpendicular to the other, and shaft 35 and bolt 45 provide a second pair of pivots each of which is always perpendicular to the other, but that although bolts 30 and 45 always lie in parallel planes, they are rotatable in those planes with respect to each other.

On rod 50 there is slidably mounted a rectangular block 56 provided with any suitable set screw means such as thumbscrew 58 adapted to lock it in any desired position on rod 50. As is shown particularly in Fig. 6 rod 50 may be flattened along one side to provide for better engagement with screw 58, and if desired rod 50 may also be made hollow for the purpose of decreasing its weight. Bracket member 60 is pivotally secured to the bottom of block 56 as by means of bolt 62 and set screw 64. It is desirable also to provide bolt 62 with a spring washer 65 to permit frictional adjustment of bracket 60 with respect to block 56. The other arm of bracket 60 has secured thereto, as by means of a bolt and nut 66, the upwardly projecting tongue portion 68 of plate 70 carrying visor 10. A spring washer 72 provides frictional control of the rotation of plate 70 about bolt 66, and said rotation is further limited by pin element 74 projecting from tongue 68 and engaging in circular aperture 75 in bracket 60. Visor 10 may be secured to plate 70 in any suitable way, as for example by means of a plurality of screws 76. There may also be included a front reinforcing plate 78 of metal, fiber or similar material, and it will be understood that any suitable gasket means may be inserted between visor 60 and plates 70 and 78.

It will be seen that the above described device provides for substantially universal adjustment of visor 10 without the use of any tools after the initial installation, and it is also adapted to hold said visor in any desired position until it is manually moved therefrom. Base plate 15 is adapted for mounting in any convenient position within a vehicle, either on the side, above the windshield, on the roof, or at any intermediate angular position. Bolt 30 and shaft 35 provide frictionally controlled vertical and horizontal pivots, respectively. The double frictional joints at the ends of link element 44 provide for adjustment of the visor in any desired plane parallel to shaft 35 and particularly in a vertical plane when the visor is in position before the eyes of the driver of the vehicle wherein it is mounted, as is illustrated in dotted lines in Fig. 1. This construction as well as the sliding fit of block 56 on rod 50 also provides for sidewise adjustment of the visor. The pivoted joint between element 60 and block 56 provides for further adjustment of the visor and makes it readily possible to keep visor 10 substantially perpendicular to the line of sight therethrough when the device is pivoted about bolt 30, as is shown in dotted lines in Fig. 2. This is particularly important in connection with a polarizing visor utilized in headlight glare elimination, since the efficiency of such a visor is at a maximum when the light is normally incident thereon. The tilting movement about bolt 66 is also of particular importance in connection with such a polarizing visor, since it provides for compensating for tilting of the vehicle itself under conditions of irregularities in the road surface, such for example as a high crown, which would otherwise tilt the visor out of the position of maximum extinction.

It is to be understood that the invention is not limited to the specific elements shown in the drawing, and that numerous mechanical variations may be made without departing from the principles of the invention. For example, other means of providing the desired frictionally controlled movements may be substituted for the particular devices disclosed. It is accordingly to be understood that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claim is:

1. Visor mounting means of the class described comprising, in combination, base plate means, visor-carrying means, and means connecting said visor-carrying means to said base plate means, said connecting means comprising means providing a plurality of pivotal connections about axes substantially perpendicular to each other and means for frictionally controlling rotation about each of said axes, said visor-carrying means comprising a plate element, means for securing a visor to said plate element, bracket means, means providing a frictionally controlled, pivotal connection between said plate element and said bracket means, and means for limiting the pivotal movement of said plate element, said last named means comprising a pin member projecting from one of said plate and bracket members and engaging in a complementary aperture in the other of said members, the diameter of said aperture being predeterminedly larger than the diameter of said pin member.

2. Visor mounting means of the class described comprising, in combination, base plate means, visor carrying means, and means connecting said visor carrying means to said base plate means, said connecting means comprising a bracket comprising a pair of members extending perpendicular to one another, one of said members being pivotally connected to an extended portion of said visor carrying means, means for limiting the pivotal movement of said visor carrying means, said last-named means comprising a pin member projecting from one of said visor carrying and bracket means and entering an aperture formed in the other of said means, the diameter of said aperture being predeterminedly larger than the diameter of said pin member, the aforesaid connecting means comprising inherent frictional engagement of parts such that said visor carrying means is thereby held stationary at any of a plurality of positions to which said connecting means enable its manual movement.

3. Visor mounting means of the class described comprising, in combination, base plate means, visor carrying means, and means connecting said visor carrying means to said base plate means, said connecting means comprising a bracket comprising a pair of members extending perpendicularly to one another, one of said members being pivotally connected to an extended portion of said visor carrying means, means for limiting the pivotal movement of said visor carrying means, said last-named means comprising a pin member projecting from one of said visor carrying and bracket means and entering an aperture formed in the other of said means, the diameter of said aperture being predeterminedly larger than the diameter of said pin member, said connecting means also comprising a plurality of yoke-like elements pivotally connected to a plurality of tongue-like elements, and said connecting means comprising inherent frictional engagement of parts such that said visor carrying means is thereby held stationary at any of a plurality of positions to which said connections permit its manual movement.

4. Visor mounting means of the class described comprising, in combination, base plate means, means comprising a substantially rigid rod, means comprising a block having a perforation adapted to receive said rod and providing a slidable connection of said block therewith, visor holding means, means comprising a plurality of pivotally connected link-like members comprising a member connected to said base plate, a second member connected to said rod, and third and fourth members providing interconnection between said first- and second-named members, said plurality of pivotally connected members enabling rotation of said rod and block means about a plurality of pivot points and in a plurality of planes, and means comprising a bracket-like member comprising a pair of perpendicularly disposed portions pivotally connected, respectively, to said block and said visor holding means, said bracket-like member and pivotal connections therewith enabling rotation of said visor holding means about two pivot points and in a plurality of planes additional to the aforesaid pivot points and planes, the aforesaid block, rod, and plurality of pivotally connected members constituting means enabling substantially universal movement of said visor holding means, pivotal connections thereof comprising inherent frictional engagement of parts such that said visor holding means is thereby held stationary at any of a plurality of positions to which said connections enable its manual movement.

CLARENCE W. COCHRAN.

REFERENCES CITED

The following references are of record in the file of this patent:

UNITED STATES PATENTS

| Number | Name | Date |
|---|---|---|
| 543,328 | Bertels | July 23, 1895 |
| 1,275,311 | Schumacher et al. | Aug. 13, 1918 |
| 1,368,997 | Bartley et al. | Feb. 22, 1921 |
| 1,498,572 | Patterson | June 24, 1924 |
| 1,514,541 | Lamb | Nov. 4, 1924 |
| 1,807,760 | Snow | June 2, 1931 |
| 1,932,697 | Jankovic | Oct. 31, 1933 |